(12) United States Patent
Seabrook et al.

(10) Patent No.: US 10,143,937 B2
(45) Date of Patent: Dec. 4, 2018

(54) SUPERFLUID EXTRACTION APPARATUS

(71) Applicant: Vitalis Extraction Technology Inc., Kelowna, BC (CA)

(72) Inventors: James Anthony Seabrook, Kelowna (CA); Ryan Alastair Mackintosh, Salmon Arm (CA)

(73) Assignee: Vitalis Extraction Technology Inc., Kelowna, BC ( * ) Notice: Subject to any disclaimer, the term of this patent is extended or adjusted under 35 U.S.C. 154(b) by 0 days.

(21) Appl. No.: 15/657,321

(22) Filed: Jul. 24, 2017

(65) Prior Publication Data

US 2018/0056211 A1 Mar. 1, 2018

Related U.S. Application Data

(60) Provisional application No. 62/378,437, filed on Aug. 23, 2016.

(51) Int. Cl.
*B04C 3/06* (2006.01)
*B04C 5/04* (2006.01)
(Continued)

(52) U.S. Cl.
CPC ...... *B01D 11/0203* (2013.01); *B01D 11/0215* (2013.01); *B01D 21/267* (2013.01); *B01D 21/34* (2013.01); *B04C 3/06* (2013.01); *B04C 5/04* (2013.01); *B04C 5/08* (2013.01); *B04C 9/00* (2013.01); *B04C 11/00* (2013.01); *F04B 15/00* (2013.01); *F04B 19/06* (2013.01); *F04B 19/22* (2013.01); *F04B 53/02* (2013.01); *B04C 2009/008* (2013.01); *F04B 53/10* (2013.01);
(Continued)

(58) Field of Classification Search
CPC .............. B01D 11/0203; B01D 21/34; B01D 11/0215; B01D 21/267; B04C 9/00; B04C 11/00; B04C 5/08; B04C 5/04; B04C 3/06; B04C 2009/008; F04B 19/06; F04B 53/02; F04B 15/00; F04B 19/22; F04B 53/10; F04B 53/14; F04B 53/16; F04B 2015/0818
See application file for complete search history.

(56) References Cited

U.S. PATENT DOCUMENTS

| 1,262,823 | A | * | 4/1918 | Merrill | ............... F25B 41/06 |
| | | | | | 137/903 |
| 3,130,157 | A | | 4/1964 | Kelsall | |
| 4,148,723 | A | * | 4/1979 | Mozley | ............... B04C 5/28 |
| | | | | | 209/726 |

(Continued)

FOREIGN PATENT DOCUMENTS

CN 202410467 U 9/2012

*Primary Examiner* — David C Mellon

(57) ABSTRACT

A cyclone separator for a superfluid extraction apparatus comprising a cyclone inlet weldment comprising a cyclone, a collector tube connected to the cyclone inlet weldment, and a needle support manifold extending from the cyclone inlet weldment comprising a fluid flow directing needle, the needle having a relief cut to control fluid flow into the separator. A supercritical fluid pump is described having a piston assembly with a hydraulic cylinder and a cylindrical integral check valve piston with at least two circumferential seals to seal the piston against the barrel insert and a check assembly extending axially through one end of the integral check valve piston and between the at least two circumferential seals to relieve excess pressure.

20 Claims, 15 Drawing Sheets

(51) Int. Cl.
| | |
|---|---|
| *B04C 5/08* | (2006.01) |
| *B04C 9/00* | (2006.01) |
| *B01D 11/02* | (2006.01) |
| *B01D 21/26* | (2006.01) |
| *B01D 21/34* | (2006.01) |
| *B04C 11/00* | (2006.01) |
| *F04B 15/00* | (2006.01) |
| *F04B 15/08* | (2006.01) |
| *F04B 19/06* | (2006.01) |
| *F04B 19/22* | (2006.01) |
| *F04B 53/02* | (2006.01) |
| *F04B 53/10* | (2006.01) |
| *F04B 53/14* | (2006.01) |
| *F04B 53/16* | (2006.01) |

(52) U.S. Cl.
CPC ............... *F04B 53/14* (2013.01); *F04B 53/16* (2013.01); *F04B 2015/0818* (2013.01)

(56) References Cited

U.S. PATENT DOCUMENTS

| | | | | |
|---|---|---|---|---|
| 4,356,084 | A | * | 10/1982 | Hatton ............... B04C 5/22 134/167 R |
| 4,564,443 | A | * | 1/1986 | Bliss ............... B04C 3/06 209/725 |
| 4,662,909 | A | | 5/1987 | Durr |
| 4,724,087 | A | * | 2/1988 | Perrut ............... B01D 11/0203 209/734 |
| 4,795,561 | A | * | 1/1989 | Aslin ............... B01D 45/12 209/726 |
| 4,844,817 | A | * | 7/1989 | Flanigan ............ B01D 17/0214 210/788 |
| 5,084,079 | A | | 1/1992 | Frohnert |
| 5,667,687 | A | * | 9/1997 | Lange ............... B04C 5/13 209/721 |
| 7,622,140 | B2 | | 11/2009 | Whittle |
| 9,132,363 | B2 | | 9/2015 | Joseph |
| 2008/0233238 | A1 | * | 9/2008 | Roney ............... B01D 11/0203 426/50 |

* cited by examiner

SUPERFLUID EXTRACTION APPARATUS

CROSS REFERENCE TO RELATED APPLICATION

This application claims priority to provisional U.S. Ser. No. 62/378,437 filed on Aug. 23, 2016, the content of which is hereby incorporated by reference.

FIELD OF THE INVENTION

The present invention pertains to a superfluid extraction apparatus. The present invention also pertains to a process of extracting desirable material from plants using a superfluid extraction apparatus.

BACKGROUND

Plant extracts are used for the preparation of drugs, cosmetics, as colorants, spices and food additives. Traditional methods of extraction are distillation, cold pressing or solvent extraction, however the method of extraction can have a significant effect on the quality of the extract, and is closely related to the choice of solvent and conditions of the extraction. Compared to other forms of extraction, supercritical carbon dioxide ($CO_2$) extraction is environmentally friendly, non-toxic, inexpensive, and the $CO_2$ solvent can be easily separated from the extract by evaporation. Moreover, by changing extraction pressure and temperature, the solubility and selectivity of supercritical $CO_2$ for species of interest can be changed to optimize the extraction.

Supercritical (or subcritical) Fluid Extraction (SFE) is the process of separating a desirable extractant from another material where supercritical fluid is the extracting solvent. Because the physical properties of supercritical fluids are close to those of liquids and their transport properties are close to those of gases, supercritical fluids can penetrate into a porous solid material more effectively than liquid solvents. Moreover, after extraction, the solvent can be easily separated from the extract by decreasing the pressure and evaporating the solvent. In an SFE extraction from plants, the matrix is usually solid matrix, but can also be liquid. SFE can be used, for example, for analytical purposes, decaffeination or component removal from a plant material, or collecting desired product such as terpenes or essential oils. The conditions for extraction of oil and other desirable components from plant material is dependent on temperature, pressure, solvent to feed ratio and flow rate, and conditions for extraction vary based on the plant material used.

Carbon dioxide is a widely used supercritical fluid extraction solvent and is sometimes modified by co-solvents such as ethanol or methanol. Carbon dioxide is a gas solvent which will be in liquid form at certain temperature and pressure. Supercritical carbon dioxide ($sCO_2$) is a fluid state of carbon dioxide where it is held at or above its critical temperature and critical pressure.

Extraction with supercritical fluid $CO_2$ has been used to remove active constituents from foods such as caffeine from coffee beans, and humulene and other flavours from hops (*Humulus lupulus*). Extraction of desirable oils and active constituents from plants removes plant cell constituents including but not limited to fats, waxes, carbohydrates, proteins and sugars. *Cannabis* plant material is being used to formulate medicinal compositions and contains sesquiterpenes, terpenes, cannabinoids (THC, CBD, CBN), flavonoids, pigments, sugars, chlorophylls, waxes, lignin, pectins, starches and cellulose. Pharmaceutical-grade *cannabis* concentrates can be prepared by extracting out the desirable active terpene materials from the non-active matrix plant materials. Supercritical or subcritical $CO_2$ extraction is generally considered the safest and cleanest method of extraction of desirable materials from plants and many compounds can be selectively dissolved into $CO_2$ by varying pressure because extractant solubility in $CO_2$ varies with $CO_2$ extraction pressure. In extraction of *cannabis*, highly controlled conditions of temperatures of $CO_2$ preserve the integrity of cannabinoids during *cannabis* oil extraction.

One factor that can influence the extraction rate and yield of extractants from plants is the presence of natural convection in supercritical extractor. Cyclonic separation is a method of removing particulates from an air, gas or liquid stream, without the use of filters, through vortex separation. Supercritical fluids are prone to natural convection because of their very low kinematic viscosity, making them particularly suitable for cyclonic separation.

U.S. Pat. No. 9,132,363 to Joseph describes an extraction apparatus for removing an extracted material from a source material in contact with a process fluid. The apparatus has an extraction vessel, a separation chamber, and a process fluid circulation conduit to direct flow of the process fluid into and out of the extraction vessel. This extractor uses valve-less expansion through an orifice pointed toward the side of separator to restrict flow to cause a rapid decompression to force $CO_2$ from supercritical/liquid to gas.

$CO_2$ functions as a solvent when it is heated or cooled and pushed through plant material at high pressure (supercritical) or low pressure (subcritical). Most $CO_2$ *cannabis* flower extractions are done in the subcritical phase before it moves on to supercritical phase because it gives a lighter colored extract, fewer waxes and resins, and retains significantly more volatile oils compared to supercritical $CO_2$ extraction. However, without the proper equipment rated for the proper pressures, creating quality $CO_2$ extracted concentrates can be challenging. Effective models of extraction and experimental tests assist to determine the basic mass transfer data necessary for scale-up procedures. The relatively slow diffusion at industrial scale superfluid extraction is often due to the difficulty to setup extraction conditions and to the change of conditions of scale up from laboratory scale to industrial scale.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a superfluid extraction system and for extracting desirable material from plants using a superfluid extraction apparatus. Another object is to provide a cyclone separator having a needle injection manifold for facilitating extraction of extractants. Another object is to provide a supercritical fluid pump having an integral check valve piston with a check assembly for facilitating supercritical pump systems.

In an aspect there is provided a cyclone separator comprising a cyclone inlet weldment comprising a cyclone, a collector tube connected to the cyclone inlet weldment, and a needle support manifold extending from the cyclone inlet weldment comprising a fluid flow directing needle, the needle having a relief cut to control fluid flow into the separator.

In an embodiment, the needle is rotatable. In another embodiment the needle is interchangeable.

In another embodiment the relief cut is variable in cross sectional size. In another embodiment the relief cut is variable in cross sectional shape.

In another embodiment the cyclone is interchangeable by profile, taper or a combination thereof. In another embodiment the cyclone separator further comprises a temperature sensor, pressure gauge, pressure release valve, or combination thereof.

In another aspect there is provided a system for superfluid extraction of an extractant from a solid material comprising a pump for pumping supercritical fluid at a pressure to maintain the supercritical fluid in a gas and liquid state, an extraction vessel, and a superfluid flow path comprising a cyclone separator comprising a cyclone inlet weldment comprising a cyclone, a collector tube connected to the cyclone inlet weldment, and a needle support manifold extending from the cyclone inlet weldment comprising a fluid flow directing needle, the needle having a relief cut to control fluid flow into the separator.

In an embodiment the needle is rotatable. In another embodiment the needle is interchangeable.

In another embodiment the system comprises more than one superfluid flow path separated by a diverter. In another embodiment the superfluid flow path further comprises an additional separator.

In another embodiment the relief cut on the needle is variable in cross sectional size. In another embodiment the relief cut is variable in cross sectional shape. In another embodiment the cyclone has a taper range of 10-170°.

In another embodiment the separator further comprises one or more heaters to regulate temperature.

In another aspect there is provided a method of extracting an extractant from a plant material using supercritical fluid, the method comprising extracting a mixture of components from the plant material with the supercritical fluid in an extractor, directing the supercritical fluid through a flow path comprising a cyclonic separator, injecting the supercritical fluid into the cyclonic separator through an injection needle, and obtaining the extractant.

In an embodiment of the method the flow path comprises more than one flow path separated by a diverter. In another embodiment each flow path comprises an additional separator.

In another embodiment the injection needle is rotatable, interchangeable, or rotatable and interchangeable.

In another aspect there is provided a supercritical fluid pump comprising a piston assembly comprising a hydraulic cylinder having a barrel insert, a cylindrical integral check valve piston comprising, at least two circumferential seals to seal the piston against the barrel insert, and a check assembly extending axially through one end of the integral check valve piston and between the at least two circumferential seals to relieve excess pressure.

In an embodiment, the pump comprises more than one piston assembly. In another embodiment the cylindrical integral check valve piston comprises more than one check assembly. In another embodiment excess pressure is released on a decompression stroke of the pump.

BRIEF DESCRIPTION OF THE FIGURES

For a better understanding of the present invention, as well as other aspects and further features thereof, reference is made to the following description which is to be used in conjunction with the accompanying drawings, where.

DETAILED DESCRIPTION OF THE INVENTION

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or element(s) as appropriate.

Herein is described a superfluid extraction apparatus and a process of extracting desirable material from plants using a superfluid extraction apparatus. The feasibility of superfluid extraction for requires the evaluation of several objectives. The solubility and mass transfer of target compounds in the supercritical $CO_2$ will determine the operating conditions for an extraction, as the pressure and temperature of extraction can have a great influence on the composition of the final extracts and oil. Further, the pressure drop effect during an extraction can have a downstream effect on yield and selectivity of the extraction. Extraction of the target compounds in the plant material and evaluation of extract quality at laboratory and industrial scale will demonstrate the feasibility of superfluid extraction for the extractants of interest. Process optimization assists to obtain the best ratio between yield and quantity of solvent amount and time of extraction and for scale up of optimization.

To maintain $CO_2$ in a superfluid state, an SFE system unit should operate within the following ranges:

Pressure=Above 7.39 MPa (1,071 psi)
Temperature=Above 31.1° C. (88.0° F.)
Flow rate=0-1 Kg of $CO_2$/minute per Kg of bulk product Subcritical conditions for $CO_2$ is below 7.39 MPa (1,071 psi) and below 31.2 degree centigrade. Preferable extraction conditions for supercritical carbon dioxide are above the critical temperature of 31° C. and critical pressure of 74 bar (1073 psi). For efficiency, to reduce waste and limit production costs, it is also of benefit for the facility to collect and recycle the $CO_2$ used as the extractant.

Figure 1:
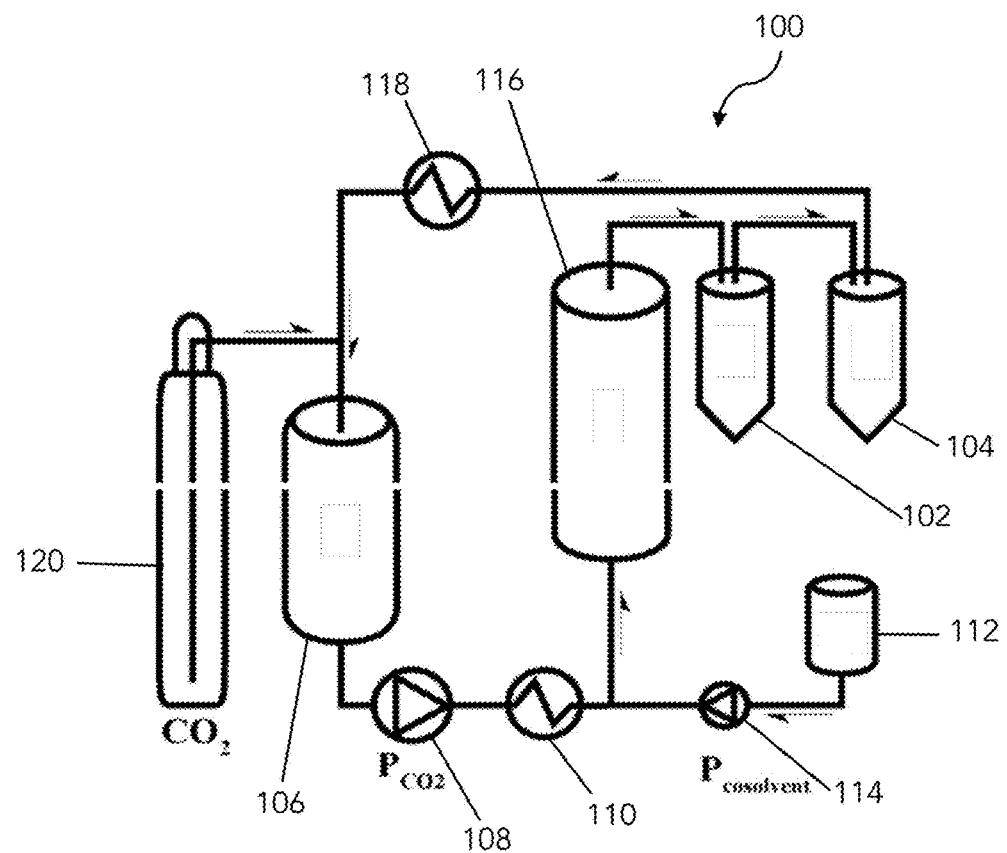
FIG. 1 is a diagram of an example superfluid extraction pilot plant.

FIG. 1 is a diagram of an example superfluid extraction system 100 equipped with two separators, a primary separator 102 containing a cyclone and a secondary separator 104. In other system configurations, multiple cyclones or primary separators can be used as well as multiple secondary cyclones or other equipment add-ons such as one or more fractionating columns or secondary separators can be used to collect volatile compounds. As shown in FIG. 1, the primary separator 102 and a secondary separator 104 run in series. The system of FIG. 1 is shown with two separators, however systems with multiple primary and/or secondary separators in series or in parallel can also be envisaged. A flow diverting assembly with a diverting valve can allow dissolved extracts and working fluid to flow through separating systems independently. In a case with multiple separators, primary and secondary separators preferably run in series and there are two or more sets of primary/secondary separator pairs that run in parallel. The diverter assembly allows for flow to go through a first or second separation side, or both, with the fluid pressure of each pair controlled independently. The diverter assembly can be operated during system use and allows for the system to run a subcritical extraction then switch to a supercritical extraction without combining the extracted materials in the same separator. An auxiliary port in the diverter assembly allows for the use of compressed air to aid in the removal of product from the extraction vessel and creating a vacuum when the system is loaded to purge the extraction vessel and lines of air. Compressed air can also purge the filter elements between cycles.

The $CO_2$ is supplied from storage tank 106 to carbon dioxide pump 108. A working fluid accumulator can also be used to store working liquid/gas supercritical fluid. Working fluid is the general term of fluid being used as a solvent. In the present system the preferred working fluid is $CO_2$, optionally mixed with a co-solvent. A high pressure multiphase pump can handle supercritical fluid solvents by enabling both the compression of gasses or the pumping of a fluid. An example of such a pump has: a double rod cylinder receiving hydraulic flow from the power unit; a three-piece pump chamber having an end cap, barrel, and discharge cap, with tie rod construction; external check valves; a pulsation dampening bladder; and pressure regulating unloader valve. Any other pump known to the skilled person useful in supercritical fluid systems may also be used, such as a liquid pump (subcritical) or other suitable compressor. The pump inlet pressure should be able to accommodate from about 100 psi to full discharge pressure. Cross flow heat exchanger 110 has the capability of optionally heating the $CO_2$ if required; in subcritical applications heating is not required.

From the carbon dioxide supply 120 and storage tank 106, the $CO_2$ is provided to a high pressure extraction vessel 116 where temperature and pressure conditions are adjusted to the desired conditions. When a co-solvent is used, cosolvent tank 112 supplies the co-solvent, and co-solvent pump 114 directs the co-solvent to extraction vessel 116. Condenser 118 can also be used, as required and, in this case shown as a pressurized tank. A hydraulic power unit can also be provided, comprised of one or more of an electric motor or Internal combustion engine, one or more hydraulic pumps, a hydraulic control system, an automatic self-reversing flow control valve, a filtration system and a hydraulic heat exchanger.

A high purity gas filter can also be integrated into the extraction system. In particular, a coalescing high purity gas filter can be used to scrub any leftover compounds and water vapor from the gas stream. Other components can include a condensing heat exchanger, an air cooled process chiller to cool accumulator and/or condenser, an industrial air compressor and a hot water circulating system for the heat exchanger. The extraction system can also have an electronic control system having circuitry and software for controlling one or more of:

inputting batch parameters and initiate extraction tracking
monitoring and recording system parameters at defined intervals
printing batch records with associated pressure and temperatures
controlling extraction parameters based on user input to adjust pressure, temperature, flow, or other process parameters
initiating cleaning cycles
detecting system failures
initiating emergency shutdown procedures
connecting to one or more networks for monitoring and reporting In addition, the extraction system can further comprise one or more electric heaters, electric motor controls, emergency stop circuitry, or automatic closure of an accumulator tank, and automatic switching of process valves. An in situ measurement device can also be used for determining the completion and real time extraction rate of the extracted material, in one example, of dissolved cannabinoids. Further, a feed through feed system can be used for continuous extraction instead of a batch type process.

Figures 2A, 2B:
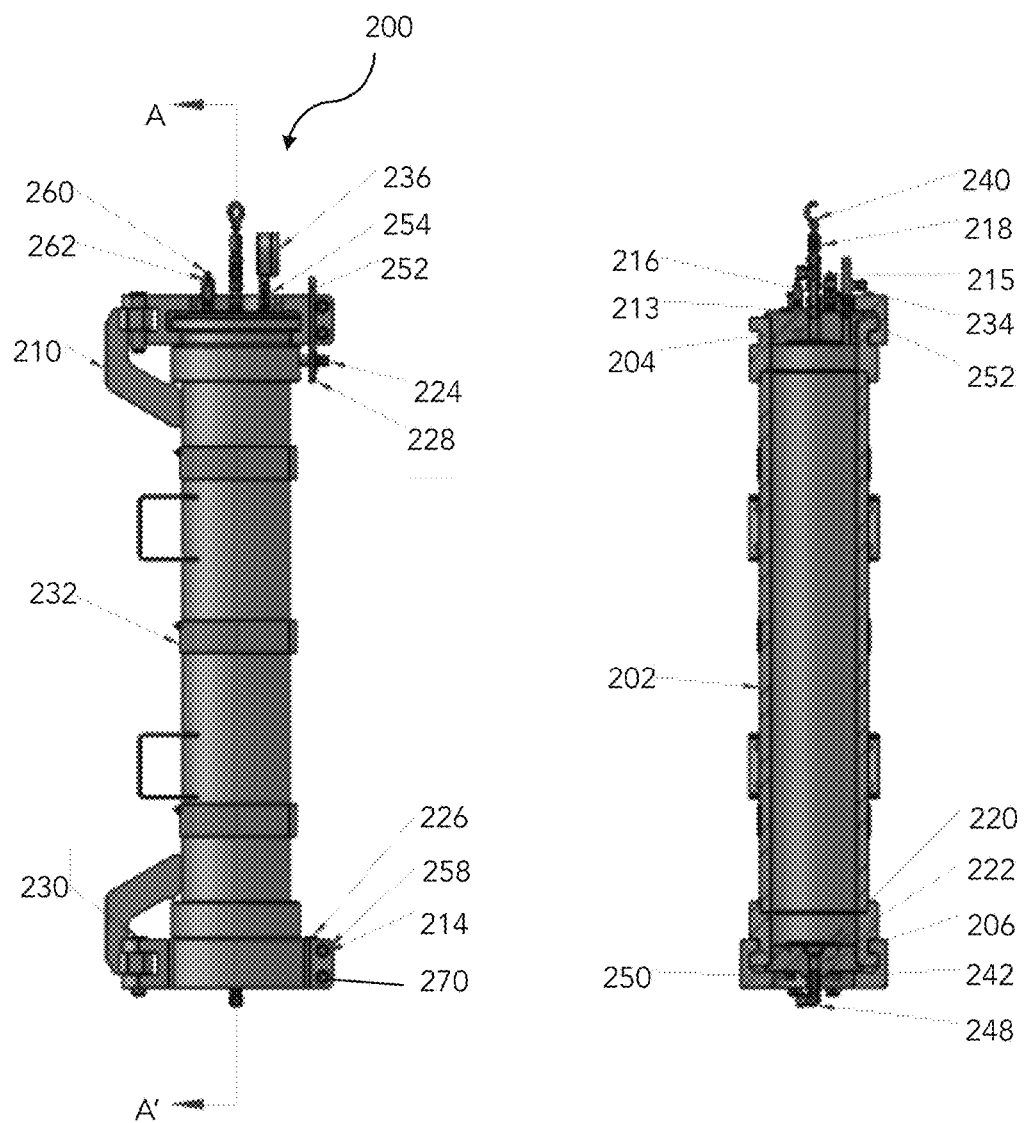
FIG. 2A is a perspective view of a high pressure extraction vessel.
FIG. 2B is a cross-sectional view of the high pressure extraction vessel shown in FIG. 2A along line A-A'.

A high pressure extraction vessel 200 is shown in FIGS. 2A and 2B with the inlet at the bottom and the discharge at the top, though it is understood that the vessel could be situated in a different orientation in the system. FIG. 2B is a cross-sectional view of the high pressure extraction vessel shown in FIG. 2A along line A-A'. The extraction vessel 200 shown in FIGS. 2A and 2B is made of high strength steel formed into a collared extraction barrel 202 coated with a uniform covering of nickel or chromium or lined with a thin wall stainless steel insert. Inlet cap 206 has a flow dispersion geometry and interchangeable filter element and discharge cap 204 has flow condensing geometry and interchangeable filter element. A two-piece clamp retaining assembly is provided for each of the inlet and discharge caps without any threading. A reversing flow manifold for determining the extraction vessel flow direction can also be provided, optionally comprised of ball valves.

A clamp lock 210 with integrated pressure safety bolt 212 is located at the top end of the extractor and prevents the opening of clamp closure prior to depressurization. Discharge tube adapter 213, discharge tube 216, discharge tube fitting 215, adapter 218, and lifting eye 240 form the discharge cap lifting assembly. Discharge tube adapter 252, discharge tube fitting 254, and pressure relief valve fitting 234 prevent the extraction vessel from experiencing an over-pressure event by releasing solvent and material from the vessel if operating pressure exceeds the preset valve activation pressure. Inlet tube adapter 242 and inlet tube fitting 248 provide a connection for solvent to enter the extraction vessel. Pipe plug 250 is provided at the inlet end for optional connection of co-solvent inlets or cleaning system adapters. The extraction vessel is typically loaded with product by removing the pipe plug. Safety keeper 226 is provided at the inlet end (bottom plug in vertical orientation) as a redundant safety feature in the event that fasteners 214 and holding nuts 258 have not been properly secured.

Prior to opening the retainer cap clamps 270 and removing the discharge cap, the extraction vessel must be depressurized. A safety bleed bolt 224 and clamp safety plate 228 prevent the opening of the clamp closure while the vessel is still pressurized. Unthreading bleed bolt 224 provides a direct vent to atmosphere for the vessel and relieves any trapped pressure. With bleed bolt 224 completely unthreaded the integral safety plate 228 can be removed. A pressure gauge 236 provides the operator with a visual indication of vessel pressure while pressure sensor 260 provides a signal to the control system for recording the pressure and digital display to LCD screen. Pressure sensor 260 and temperature sensor 262 provide continuous monitoring of pressure and temperature, respectively, in the extraction vessel.

Filter retainer 220 and filter membrane 222 are provided at the inlet and/or discharge end to prevent product from entering the process piping. Solvent flow with intermittent reverse flow can be used to dislodge any particles trapped in the filter membrane. During loading and unloading of the extraction vessel the filters are pulled with compressed air to clean the filter elements. The filter elements can be replaceable or interchangeable with various types of filters, including but not limited to cloth, wire, sintered material, or a combination thereof. Extractor retainer cap clamps 270 are hinged on pins 230 that allow for the opening of cap clamps 270 without the requirement for supporting them when in the open position. One or more band heaters 232 can be placed at various locations on the extraction barrel to maintain vessel temperature and can be controlled by electronic circuitry. The band heaters 232 are capable of heating the vessel material which heats the solvent solution by way of convection on the vessel internals.

A pneumatic loading and unloading system is situated for getting product into and out of the extraction vessel. A pre-load vessel (not shown) for measuring and storing the bulk product has an open top and bottom and a compressed air port for pushing material into the discharge cap.

Figure 3A:
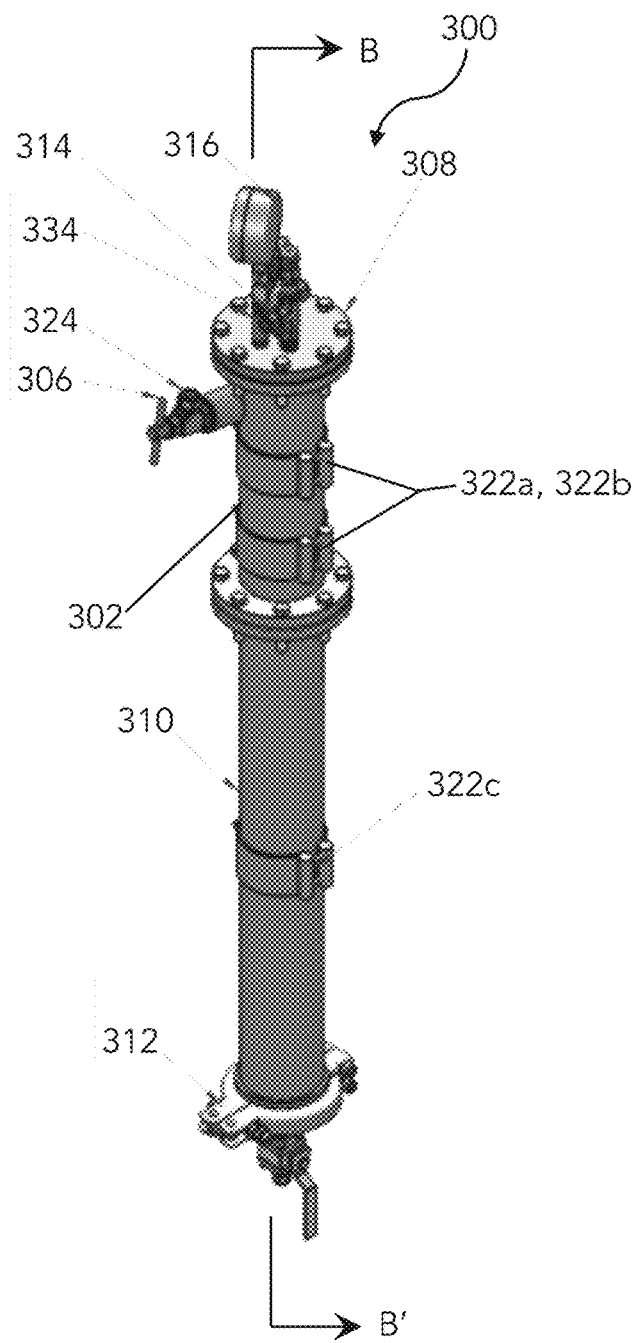
FIG. 3A is a perspective view of a separator assembly.
Figure 3B:
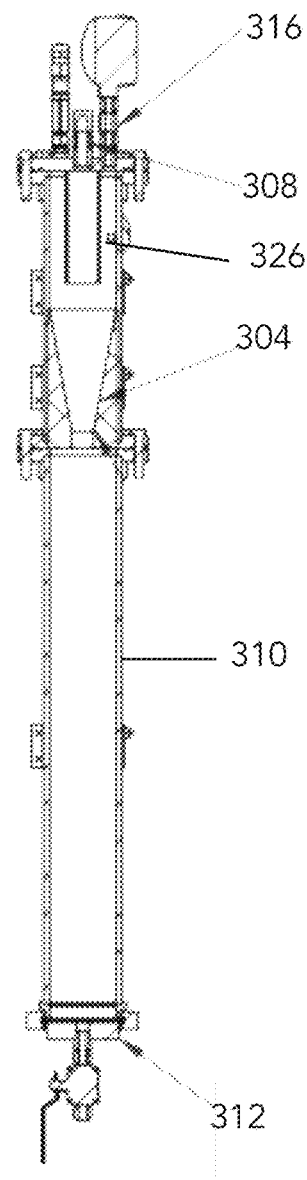
FIG. 3B is a cross sectional view of the separator assembly shown in FIG. 3A along line B-B'.

A primary cyclone separator 300 is shown in FIG. 3A. The cross section of primary separator 300 along axis B-B' is shown in FIG. 3B. As shown in FIGS. 3A and 3B, primary separator 300 is a modular cyclone separator having a cyclone inlet weldment 302. The primary separator 300 has a bolt on top cap 308 with multiple ports including pressure gauge 316, pressure relief valve 314, and temperature sensor 334. Tube adaptor 330 in the top cap directs $CO_2$ gas that has vaporized from the mixed inlet flow (liquid or supercritical) to the secondary separator assembly. Primary cyclone separator 300 also has a variable geometry cyclone insert 304, a collector tube weldment 310, and bottom vent cap 312. A loading cap comprised of a cyclone separator that connects the extraction chamber. A fine particle filter can be attached to the top loading cyclone. A vacuum can also be applied to the loading cyclone.

A needle support manifold 324 extends from the side of the cyclone inlet weldment 302 and has a flow directing needle manifold inlet 306. The needle inlet 306 can be rotated to change the inlet flow properties of the process fluid. The geometry of the needle inlet 306 can also be modified to change the open area of the cyclone inlet cross section to change the inlet fluid velocity and pressure.

Figure 3C:
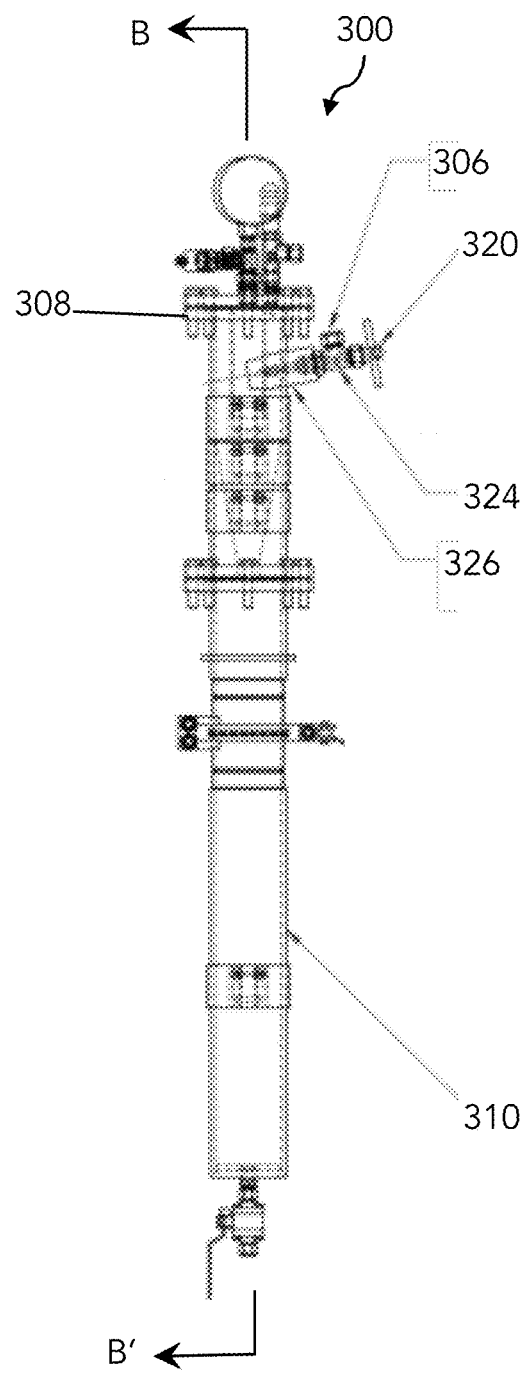
FIG. 3C is a cutaway cross sectional view of the separator assembly shown in FIG. 3A along line B-B'.

The present apparatus functions on the principle of high speed laminar flow. The inlet needle is selected to match a desired flow rate and ensure a minimum inlet velocity. According to principles of cyclonic separation and cyclonic theory, mixed flow decelerates and the $CO_2$ is heated and/or vaporized from the drop in pressure while extracts continue to decelerate and drop through the bottom of cyclone. Cyclone back pressure is regulated to ensure high pressure extraction does not create a super cooling-effect. The inlet needle can have a variable size to create the desired pressure drop based on flow rate of the pump. The interchangeable inlet needle allows an operator to define the combined fluid flow velocity which directly effects the pressure drop across the cyclone. The cyclone can also be equipped with a back pressure regulating system to control the pressure drop range Tapered cyclone insert 304 is shown in FIG. 3B, and FIG. 3C is a cross sectional view of primary cyclone separator showing a cross section of needle support manifold 324. Needle support manifold 324 supports needle manifold inlet 306, which houses injection needle 320, and has a cyclone body needle inlet port 326. The cyclone weldment can be fabricated in such a way that the inlet flow will be tangent to the inside diameter of the cyclone pipe. The inlet can also pointed in a general downward direction to start flow toward the taper cone insert. The inlet can also be changed to accommodate the system flow rate and be replaced, such as when worn as a result of friction.

The cyclone can operate with a liquid level above or below the inlet creating a vortex of liquid inside the vessel which increases total surface are for boiling of a solvent. The liquid level can thereby be used to fraction components where a solution of liquid $CO_2$ (or other solvent) is drawn from the bottom at a controlled rate and a portion of the flow is drawn from the top where fats (or a second fraction) is dominant in the stream.

The needle support manifold connects the fluid flow line to the cyclone weldment. The fluid enters through the needle support manifold and is directed along the injection needle 320, which runs along the manifold discharge axis. The inlet components can be easily removable from the weldment for maintenance and cleaning. The tapered cyclone insert 304 can also be interchangeable so that the cyclone properties can be modified by changing the cone profile or taper of the cyclone insert 304. The function of the taper is to maintain the tangential speed of the particles flowing in the cyclone so that they are forced against the tube wall. The cyclone insert 304 can be selected prior to the extraction based on the desired speed of extraction and solvent flow of particles in the extraction. The cyclone insert 304 can be made from a same or dissimilar metal from the cyclone inlet weldment 302. The collector tube weldment 310 provides containment of oils coming through the cyclone and can be discharged while the system is operational through a discharge valve mounted to bottom cap 312.

The depressurization and phase change of inlet flow can cause a rapid cooling effect and freeze components. Accordingly, the inlet weldment can also be heated to maintain fluid flow through the components. Furthermore, the inlet manifold can be heated with control circuitry to reduce 'free-up' of the inlet components and ensure continuous process flow. The inlet manifold can further have multiple inlets flows as desired. Optional external cyclone heating elements 322a, 322b and 322c can be provided to create a differential thermal profile and provide thermal control throughout the cyclone. Applying differential temperature can allow plant oils to separate at higher temperatures and reduces volatility of compounds at low temperature.

Figure 4A:
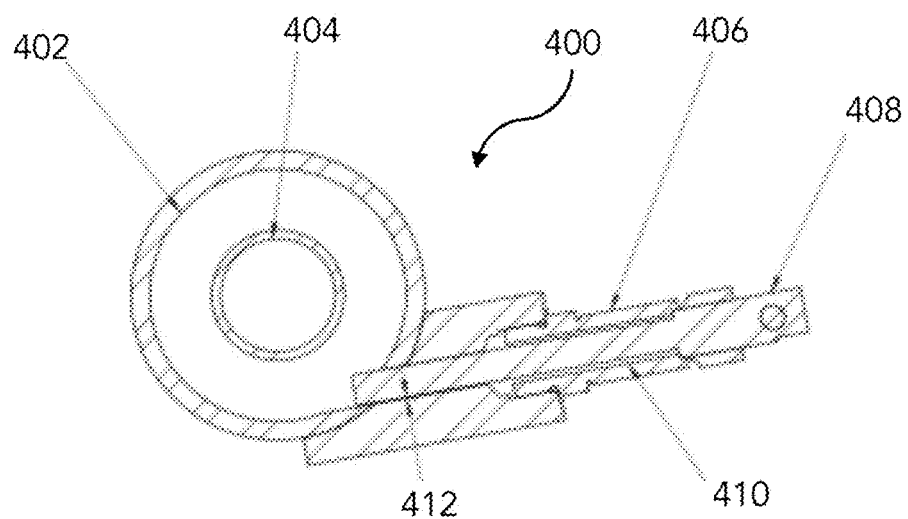
FIG. 4A cross-sectional view of the cyclone inlet weldment.
Figure 4B:
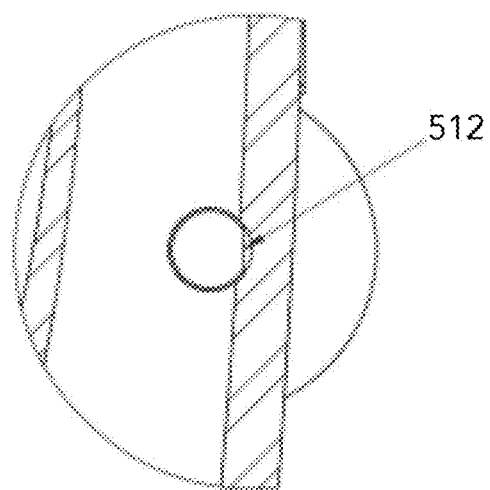
FIG. 4B is an enlarged cross-sectional view of the inlet control needle as shown in FIG. 4A.

FIG. 4A is a cross-sectional diagram of a needle support weldment 400 of a primary separator shown with a top view cross-section of a cyclone inlet weldment 402 and discharge tube 404, wherein the discharge fluid flows through the discharge tube in an upwards direction relative to the Figure. Inlet manifold 406 can be heated to reduce clogging and freeze up caused by the pressure drop of fluid passing along the injection needle. Injection needle 408 provides fluid control into the cyclone tube. Multiple needle inserts are available for interchangeable exchange. Each needle imparts flow properties of the fluid entering the separator by the depth of cut on the needle which determines the effective open area of the cyclone inlet, thus controlling the fluid inlet velocity and direction. Adjusting the inlet needle cross section by replacing the needle with one of larger or smaller open area, the geometry creates the desired pressure drop based on flow rate of the pump. The needle 408 can be interchanged by releasing the needle retaining system and pulling the needle out of the assembly along the needle inlet axis. The fluid flow channel 410 enters perpendicular to the needle and travels along the needle relief cut parallel to the needle axis, entering the cyclone separator at a tangential path to the cyclone inlet weldment. A sample width 412 of the flow channel between the needle weldment is shown. FIG. 4B is an enlarged cross-sectional diagram of the inlet control needle with a cross section of needle inlet 410

The injection needle 408 is designed to occupy space along the manifold discharge path, thus reducing the cross sectional flow area and increasing the fluid inlet velocity. The sample cross section is shown as a circular hole entering the cyclone weldment and a circular needle with one milled (flat edge) along the needle axis. The inlet geometry could be such that the hole entering the cyclone weldment is another geometric shape to effectively reduce the inlet area and maintain a tangent inlet flow.

The needle is easily replaced from the exterior of the inlet weldment so that an operator can control the inlet area from the exterior. If the process is operating at a low pressure extraction (700-1000 psi) the operator might select a relatively open inlet area (more flow, lower pressure drop). For a medium pressure application (transcritical) the operator might use a medium open area needle with moderate pressure drop. A high pressure extraction could use a small open area needle to induce a large pressure drop (1000 psi or more)

Figure 5A:
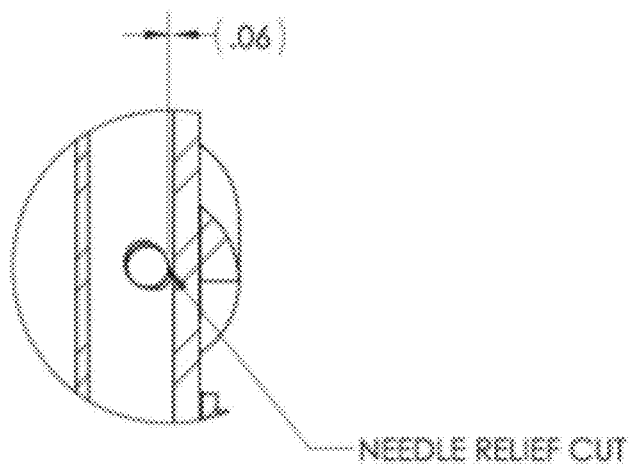
FIG. 5A is an example of a high pressure, low flow injection needle with the inlet mostly blocked.
Figure 5A:
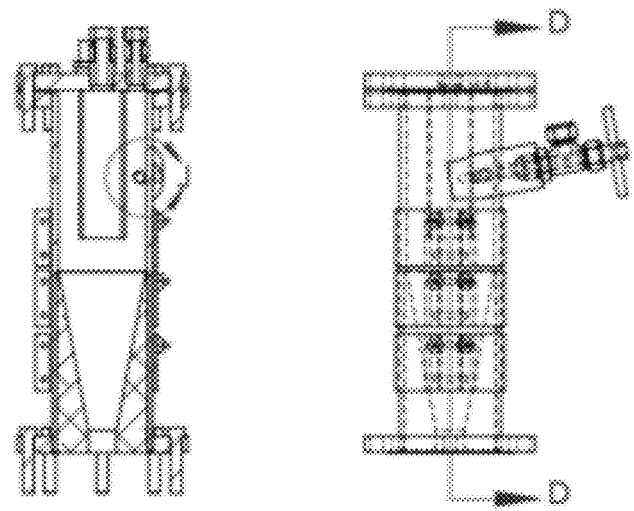
Figure 5B:
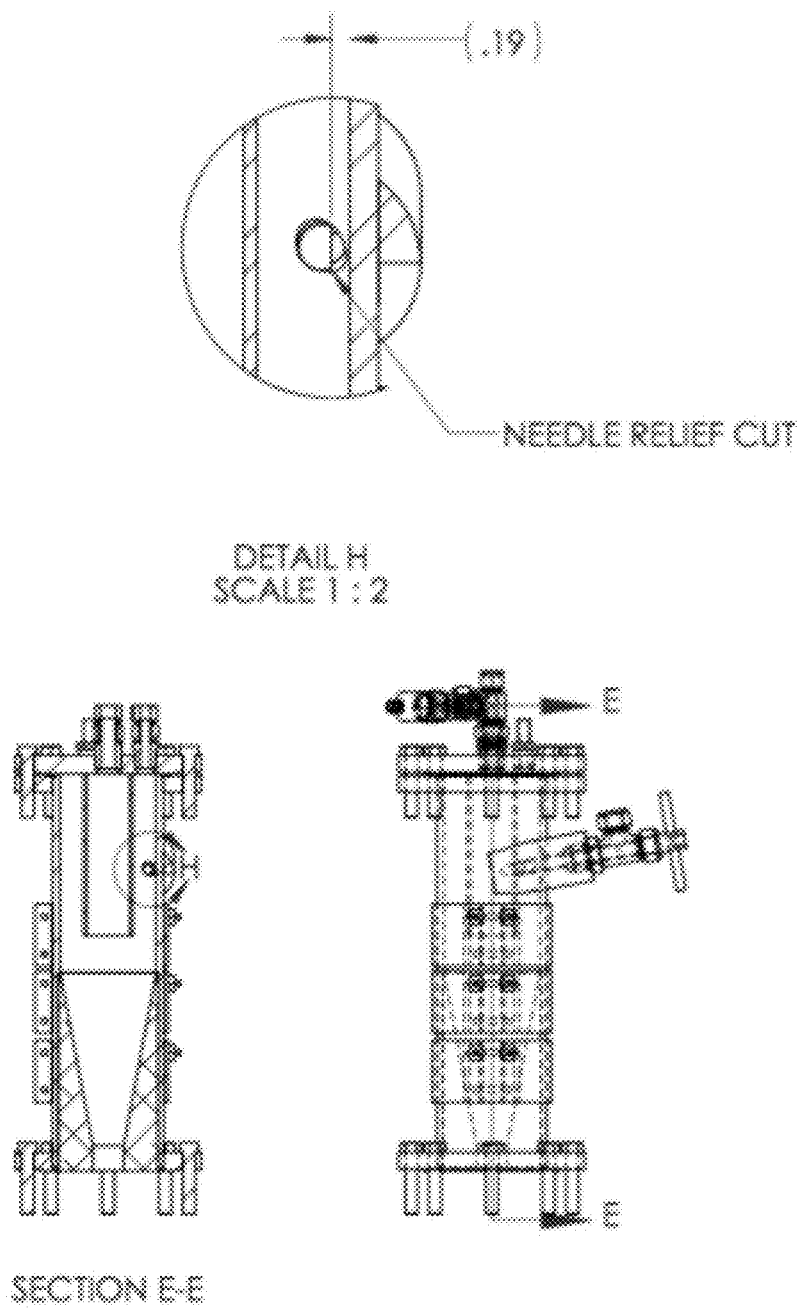
FIG. 5B is an example of a medium pressure, medium flow injection needle with the inlet partially blocked.
Figure 5C:
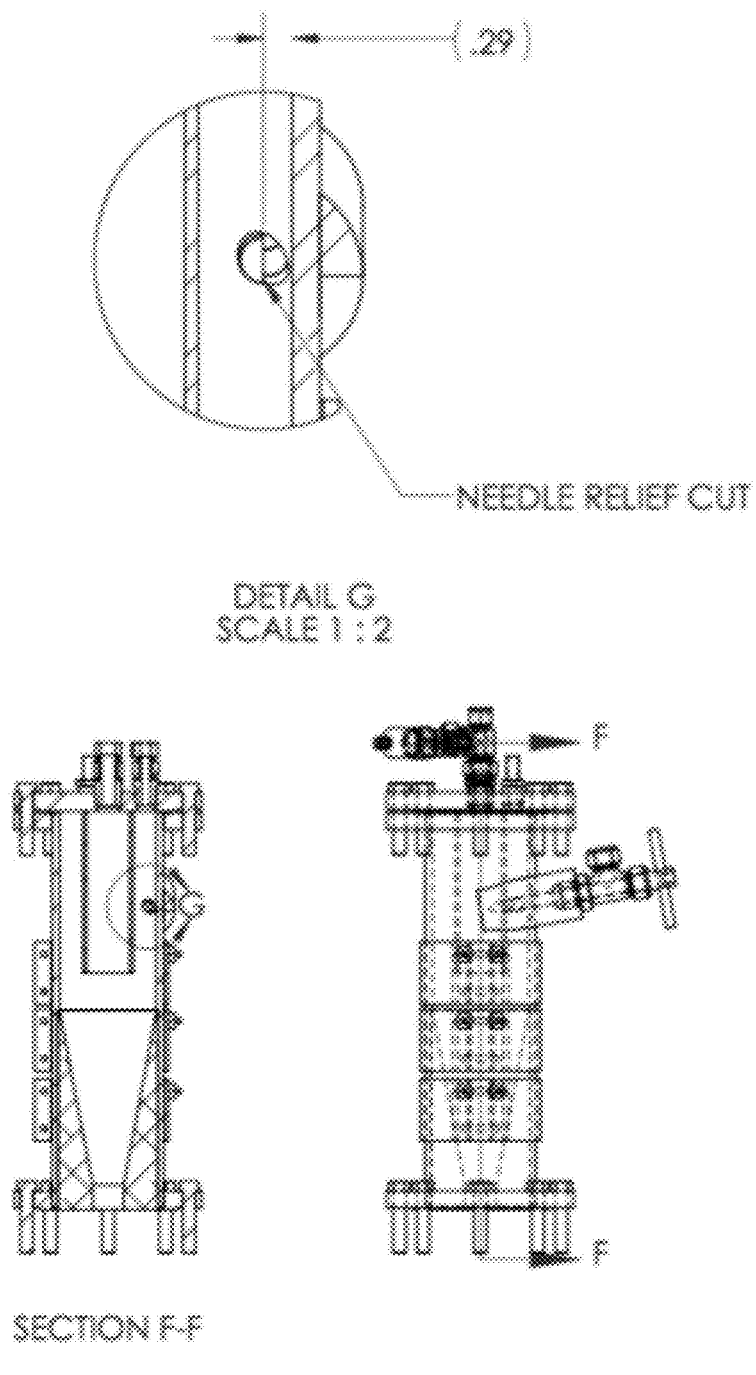
FIG. 5C is an example of a low pressure, high flow injection needle with the inlet half blocked.

FIGS. 5A-C show examples of variable sized needles FIG. 5A is an example of a high pressure, low flow injection needle with the inlet mostly blocked; FIG. 5B is an example of a medium pressure, medium flow injection needle with the inlet partially blocked; and FIG. 5C is an example of a low pressure, high flow injection needle with the inlet half blocked. The needle relief cut runs along the axis of the needle and controls fluid flow into the cyclone separator. In each case, the needle relief cut varies, which controls the fluid flow by controlling the cross sectional size and shape of the fluid flow channel. Controlling the needle relief cut and therefore the fluid flow rate provides greater variability on the pressure of the fluid entering the cyclone tube.

In another embodiment, rotating the inlet needle changes the internal flow properties by proportionally directing flow against the cyclone wall or away from the inner radius of the wall as the fluid enters the cyclone chamber. The needle manifold can be removed for cleaning and replacement or modification as desired. Without being bound by theory, it has been found that using a needle with a flat end cross section is preferable as it creates a semi-circular inlet profile. The needle inlet weldment can be also be changed to provide a different inlet angle of the needle inlet with respect to the cyclone body.

Figure 6:
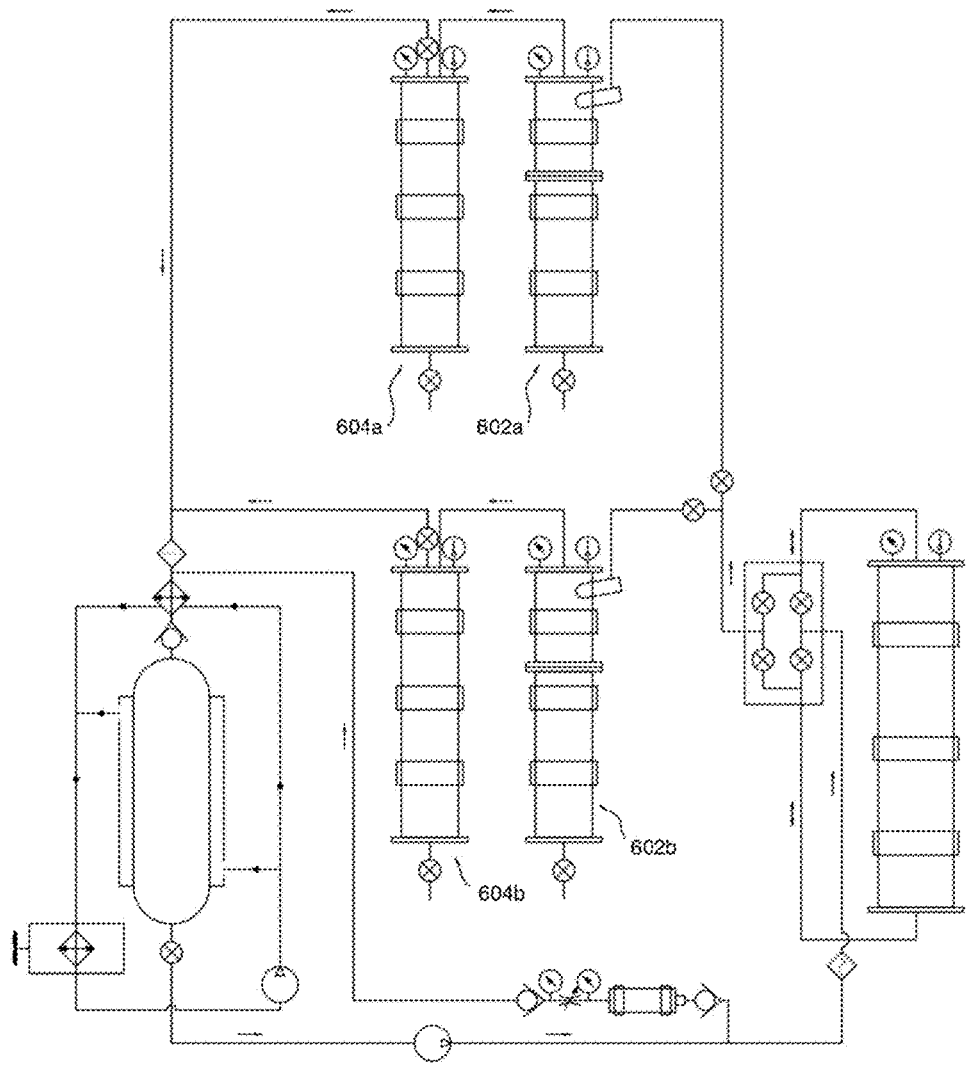
FIG. 6 is a process diagram of an example of a superfluid extraction pilot.

FIG. 6 is a process diagram of another example of a superfluid extraction pilot plant having a diverter assembly which diverts flow between two sets of separators. Primary separators 602a and 602b are on different flow paths, and flow into secondary separators 604a and 604b, respectively. Each of primary separators 602a and 602b has its own cyclone and its own needle weldment, and can process material and fluid at different fluid pressures depending on the requirements of the process. In one example, primary separator 602a can operate at a supercritical fluid pressure while primary separator 602b can operate at a subcritical fluid pressure.

Figure 7A:
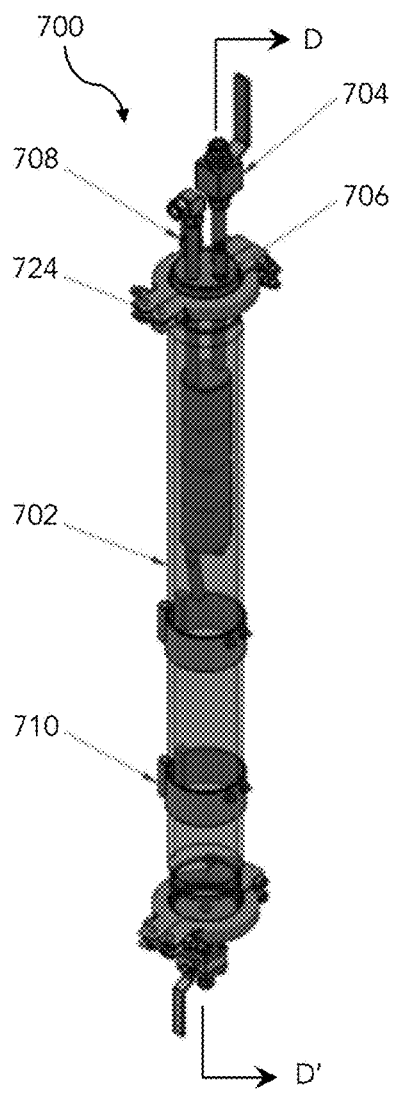
FIG. 7A is a perspective view of a secondary filter separator.

FIG. 7A is a perspective view of a secondary filter separator 700 having a separator weldment 702, inlet sanitary seal 714 with discharge valve 704 and inlet tube fitting 712, and outlet tube adapter 718 with outlet valve 720 and top cap 724. Discharge valve 704 and outlet valve 720 can be a ball valve or any other valve known which is functional under the system conditions. Temperature sensor 706 and pressure sensor 708 are provided adjacent the inlet valve 704 to measure the temperature and pressure, respectively, entering the secondary filter separator 700. Optional band heater 710 can be used to heat the separator weldment 702 to control the internal temperature of the secondary filter separator 700.

Figure 7B:
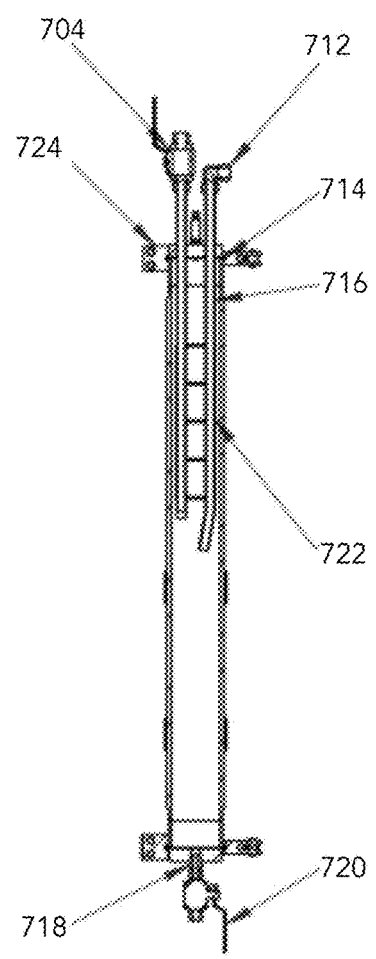
FIG. 7B is a cross-sectional view of the secondary filter separator of FIG. 7A along line D-D'.

FIG. 7B is a cross-sectional view of the secondary filter separator of FIG. 7A along line D-D'. Secondary filter separator 700 is a high surface area coalescing secondary separator having a separator cartridge 716 with a cross flow filter 722 comprising a filter material that is removable for cleaning and collection of volatiles which have accumulated or condensed on the surface. The secondary separator uses internal packing of high surface area media as a filter material. Non-limiting examples of the filter material can include sintered stainless steel, steel wool, balls, or a combination thereof. The $CO_2$ gas and any other vapors that carry over from primary cyclone is forced to flow through this media which helps condense and collect on the high surface area media. The separator cartridge 716 with the filter material can be removed and washed for collection of coalesced vapors.

Figure 8A:
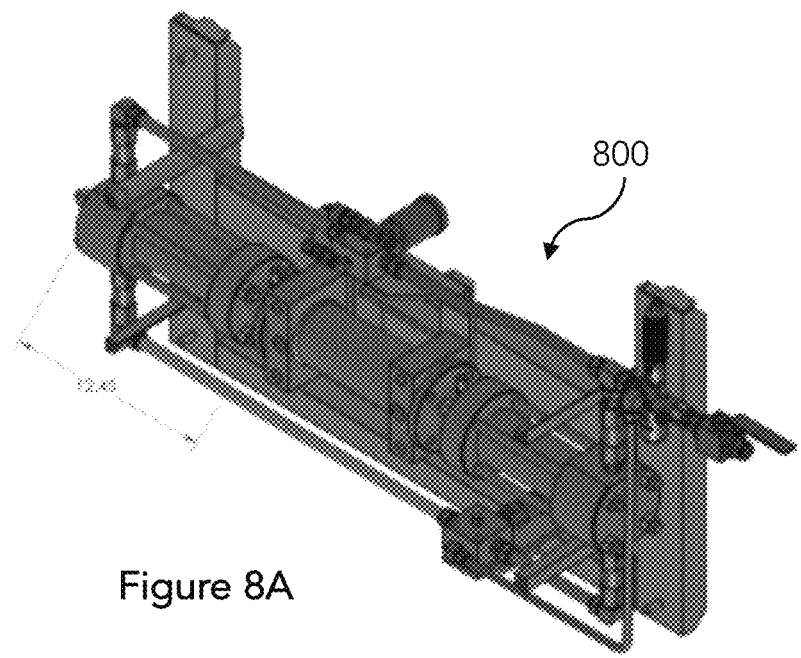
FIG. 8A is a perspective view of an example of superfluid pump.
Figure 8B:
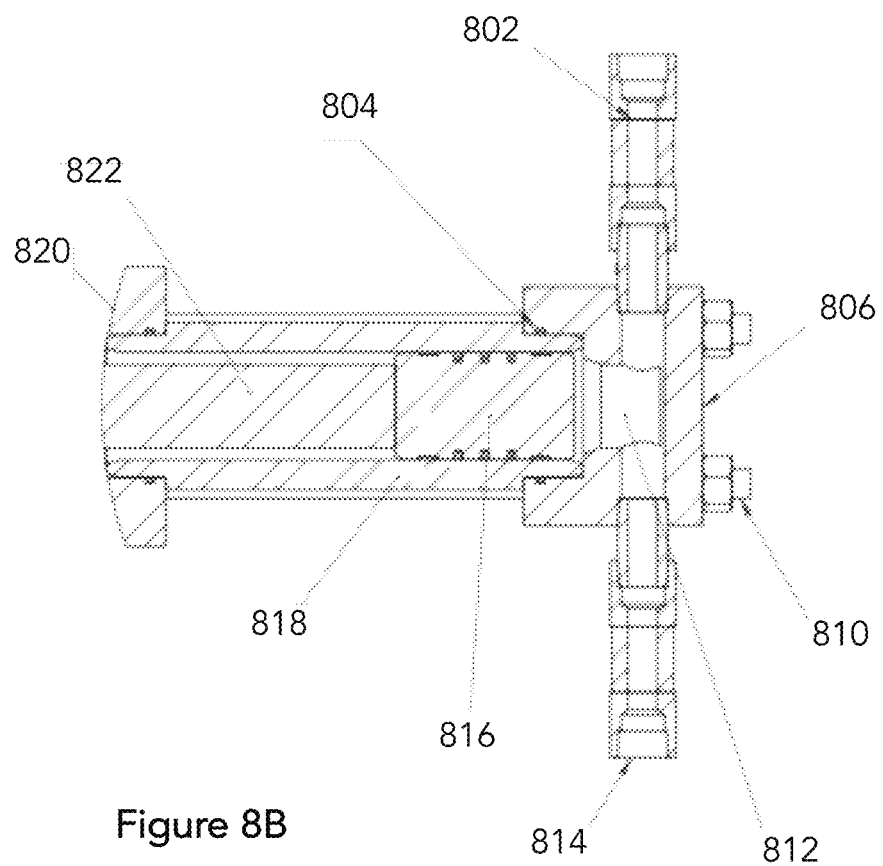
FIG. 8B is a close up cross sectional view of one integral check valve piston and associated pump manifold.

An example of superfluid pump is shown in FIG. 8A. A close up cross sectional view of one integral check valve piston and associated pump manifold is shown in FIG. 8B. The pump is comprised of a pump end assembly with adjacent inlet manifold with inlet flow direction check valve 814. The pump end assembly comprises a cylinder adapter, barrel seals 804, pump head 806 and tie rods 810. A double rod hydraulic cylinder has barrel insert 818, coupling head 820 and mechanical activation rod 822. Integral check piston assembly 816 (one is situated on each end) creates a seal in one direction and allows any trapped pressure to be released when the piston direction is reversed during the decompression stroke. An intermedia lubricating fluid can be used on the mechanical activation side of the piston. This back end lubricating fluid flows through the cylinder adapter into a fluid reservoir 812. Discharge check valves 802 control flow out of the pump. A discharge manifold also has a charged flow accumulator, a regulating and unloading valve assembly to control discharge pressure, a vaporizing chamber, and a gas pressure regulator to charge accumulator (storage tank).

The entire pump assembly can be scaled to multiple units and controlled to provide a continuous flow with double, triple, etc., flow comprising multiple integral check valve pistons. The pump is controlled by a hydraulic circuit with an automatic reversing valve. The timing (flow) and (pressure) of the hydraulic circuit defines the flow and pressure of working fluid that passes through the pump end. Preferably, the working fluid is liquid $CO_2$.

Figures 9A, 9B:
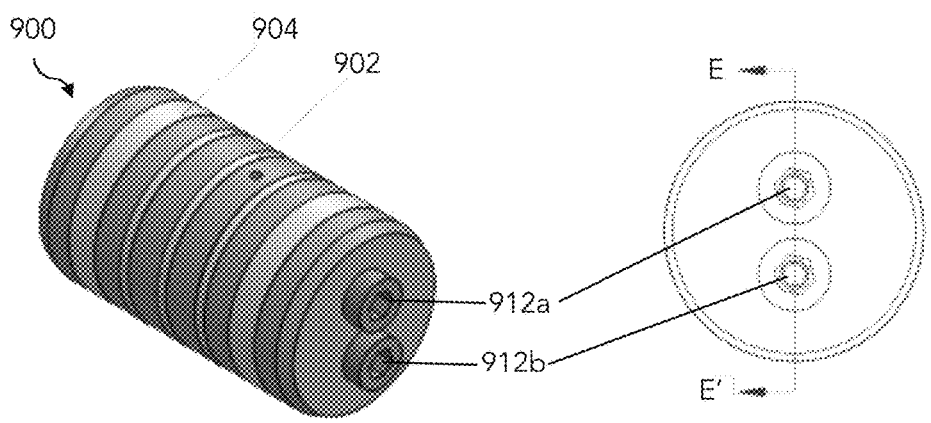
FIG. 9A is a perspective view of an integral check vale piston.
FIG. 9B is an end view of the integral check vale piston of FIG. 9A.
Figure 9C:
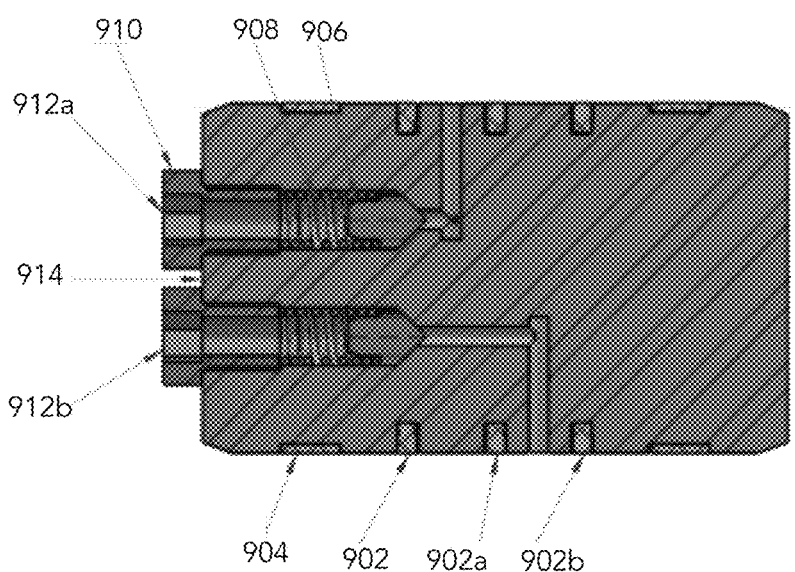
FIG. 9C is a cross sectional view of the integral check valve piston of FIGS. 9A and 9B along line E-E'.

FIG. 9A is a close up perspective view of an integral check valve piston 900 having a piston seal 902 and wear band 904. FIG. 9B is an end view of the integral check valve piston, and FIG. 9C is a cross sectional view of the integral check vale piston 900 of FIGS. 9A and 9B along line E-E'. Check assemblies 912a and 912b create a seal in one direction and allow any trapped pressure between 902 and 902a or 902a and 902b to be released when the piston direction is reversed (decompression stroke). The number of seals 902 and check assemblies is only limited by the physical geometry of the part. A piston of larger diameter could have n number of seal assemblies paired to more check assemblies for added seal reliability and redundancy.

Integral check vale piston 900 shown in FIG. 9C has two check assemblies 912a, 912b, each having a spring 906, check stop 908 and spring retainer 910. Shown is a single acting configuration with primary circumferential seal 920 and two safety backup seals 902a, 902b, however fewer or more safety seals are also possible. A check valve can drain excess pressure between seals 902 and 902a and seals 902a and 902b. More than three seals can also be added, as well as more check valves depending on the physical limitations of the piston. The piston design can have any number of seals with an integrated check valve system to relieve the trapped or bypassed pressure on the pump decompression or reverse stroke. The seals are preferably made from Teflon. In one preferable pump arrangement of the present invention, the fluid pump has multiple seal pistons with seal failure relief internal check valves. Pistons will typically only have one seal or two seals that work in opposing directions that pressure cannot be trapped between the seals and cause a blowout or failure.

Solvent

Solubility in a supercritical fluid increases dramatically with increasing density, and different solutes can have different solubility at the same fluid and solvent conditions. In one example, *Cannabis* oil can be extracted best under conditions=temperature=31.2 to 32.0 degree centigrade and pressure 73.8 to 74 bar.

Optimizing solvent composition and mixing in one or more co-solvents to the main working fluid can expedite extraction times and improve system efficiency. A variety of solvents and co-solvents can be used in superfluid extraction processes, as shown in Table 1.

TABLE 1

| Solvent | Critical Temperature (° C.) | Critical Pressure (MPa) |
|---|---|---|
| Water | 374.0 | 22.1 |
| Methanol | −34.4 | 8.0 |
| Carbon dioxide | 31.2 | 7.3 |
| Ethane | 32.4 | 4.8 |
| Nitrous oxide | 36.7 | 7.1 |
| Propane | 96.6 | 4.2 |

Integrated Refrigeration Process with SFE Apparatus

A closed loop super fluid extraction (SFE) recirculation process requires use of a cooling process to condense $CO_2$ gas or other superfluid solvent back to a liquid phase for storage and pumping. Refrigeration to condense the superfluid gas is more efficient than compression of a gas with applied pressure alone. A liquid process fluid is typically used for this application, delivered via a circulation pump to heat exchangers for this cooling process as well as for chilling the accumulator. This chilling or heat removal process fluid typically comes from an industrial/commercial chilling machine which uses a conventional evaporating heat exchanger chilled by a refrigeration circuit with heat being rejected to the air by a condensing heat exchanger and fan assembly. Occasionally these industrial chilling units will also use a heat recovery process or liquid exchange on the condensing exchanger to use energy/heat for a secondary application.

An embodiment of the present superfluid extraction system eliminates the need for a process heat transfer fluid by integrating the refrigeration evaporation process and having the refrigeration circuit act directly with the working superfluid process via a high pressure heat exchanger. A refrigerant (such as, for example r404 or r744, etc) can be supplied by an air or liquid cooled condenser and evaporated in a high pressure heat exchanger integral with the superfluid extraction process to remove heat from the superfluid process causing a condensing phase change that is more efficient than using a working fluid cooling system such as water or water-glycol mixture. Because the heat removal acts directly on the end working fluid, lower temperatures are attainable via the principle of temperature differential required for transfer in a heat exchanger. Alternatively, $CO_2$ can be used as a refrigerant for a completely enclosed system in lieu of using non-organic r122, r404, r504 or other refrigerants. Heat recovery can also be done by the refrigeration system for process heating.

In one example, assuming a theoretically efficient heat exchanger requires a temperature differential of approximately 10 degrees centigrade, the maximum temperature difference of the refrigerant evaporation temperature to working fluid is 20° C. higher (−10° C. evaporation, 0° C. cooling fluid, 10° C. process fluid). In this case the direct acting heat exchanger for a superfluid extraction apparatus the evaporation temperature would remain −10° C. but working fluid (SFE process) would be reduced to 0° C.

Figure 10:
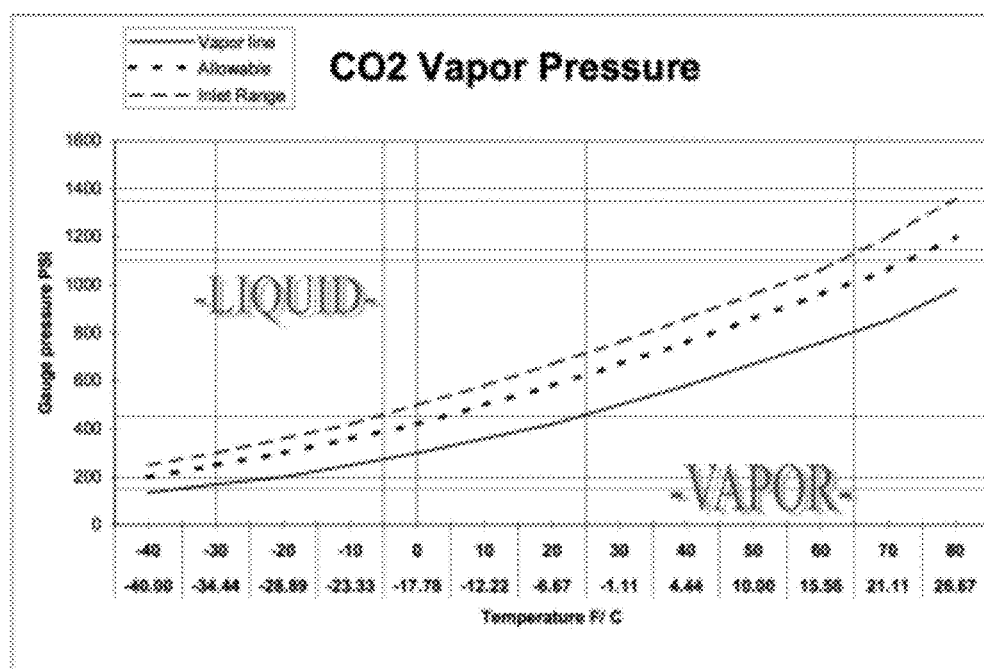
FIG. 10 is a graph of vapor pressure curve for a saturated vapor at a given temperature.

The reduced cooling process temperature subsequently can provide a lower SFE process accumulator temperature which allows for numerous benefits and process improvements. The lower accumulator temperature can also provide for a lower saturated vapor pressure of working fluid, and subsequently a lower operating separation pressure in a closed loop system such as the described SFE system. In addition, a 10° C. lower temperature results in a vapor pressure reduction of approximately 60 psi for $CO_2$. FIG. 10 shows a graph of vapor pressure curve for a saturated vapor at a given temperature.

Lower separation pressure in the process allows for a lower separation temperature while maintaining a gas phase for efficient separation. In an example, product separation from the working fluid stream in the cyclone separator working at 400 psi only requires to be heated above about −8° C. for a gas phase conversion while a separator operating at separator operating at 650 psi will require a temperature above about 10° C. to maintain a gas phase change. A lower separation temperature maintains the recovery of essential terpenes and desirable low temperature volatile compounds. Further, since terpenes are soluble in water that is present in the extraction process it is desirable to keep the separation temperature below 0° C. for the purpose of freezing water in the extraction stream which will then hold and maintain a high concentration of terpenes in the extract.

The use of an onboard refrigeration circuit also allows for the recovery of heat from the condensing heat exchanger of the refrigeration fluid. The heat recovery via liquid heat transfer can then be used to heat the cyclones and separator as required. The overall balanced heat load system can drastically reduce the power required to operate a SFE machine since instead of waste energy being exhausted to the environment via air or liquid, secondary recovery of energy provides for energy reuse and recirculation. The efficient design of an integrated on-board refrigeration circuit can also eliminate the need for both external process heating and process cooling. In contrast, the resulting energy consumption from a conventional multiple machine system is approximately 60% to 50% of electrical load consumption.

Figure 12:
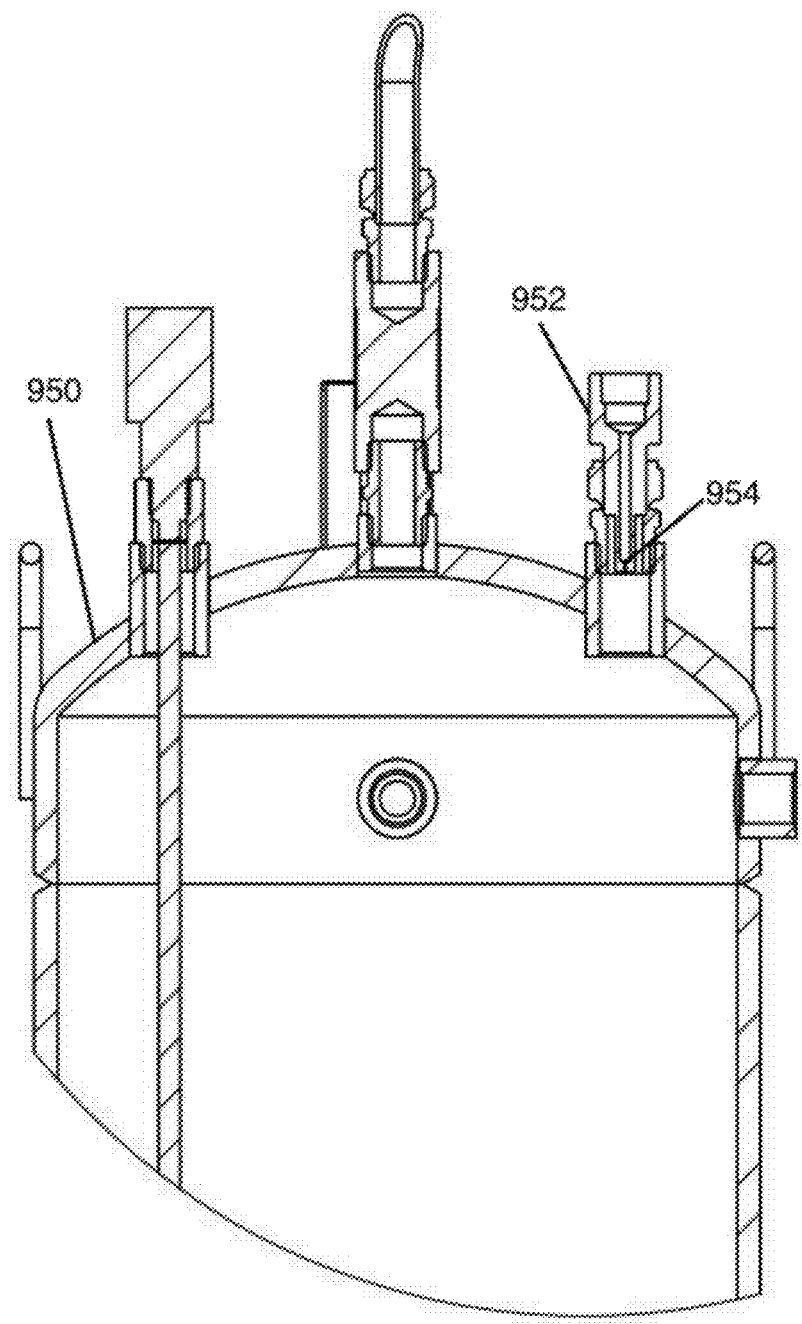
FIG. 12 is a cross sectional diagram of an orificed injection nozzle.

Evaporating Nozzle for Super Cooling Accumulator Fluid $CO_2$ can be described as both a working fluid for SFE and also an industrial refrigerant, commonly known as r744. FIG. 12 is a cross sectional diagram of an orificed injection nozzle that can be used to effect this pressure differential. Using the principle of phase change from liquid (low internal energy) to gas (high internal energy) and latent heat required for vaporization, liquid $CO_2$ can be taken from the SFE process pump at high pressure (for example, above 1000 psi) and discharged through an injection nozzle 952 having an injection orifice 954 inside the accumulator vessel 950 to a pressure between 600 psi and 200 psi depending on the system. This rapid decompression removes energy from the atmosphere, in this instance, from the vapor in top of accumulator, which creates a supercooling effect and subsequently reduces the vapor pressure of accumulator vessel 950 and reduces the required cooling load from an external or integrated refrigeration or cooling process.

The amount of pump flow taken for this cooling process determines the amount of cooling generated from the injection/vaporisation process. A flow metering device can be used on the injection liquid line to control the amount of cooling or rate of heat removal. A pressure regulating valve can also be used on the liquid line to regulate the inlet pressure of liquid to the injection nozzle 952 and effect the quantity of heat removal.

Example 1: SFE Extraction of *Cannabis* Oil

Figure 11:
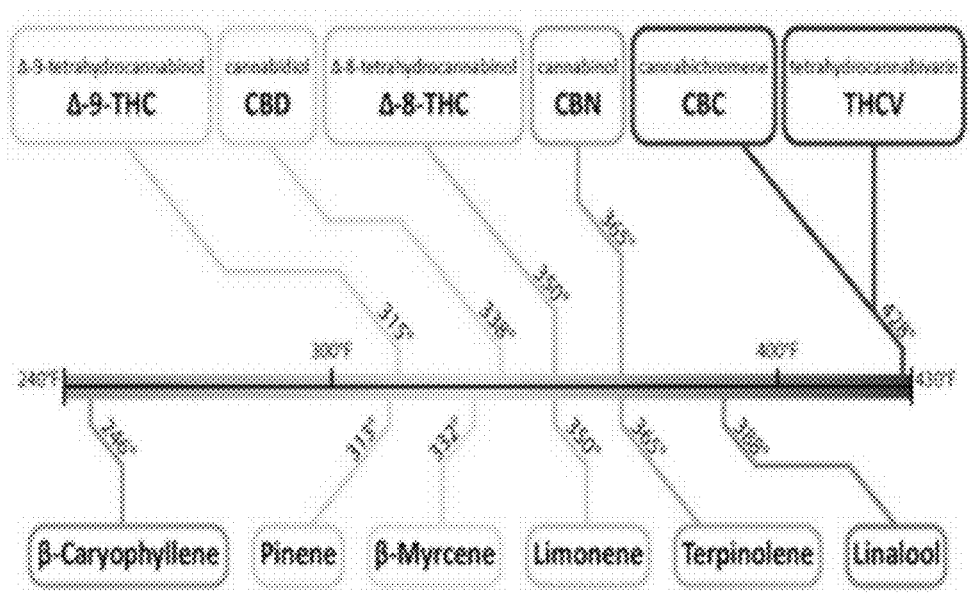
FIG. 11 shows optimal recovery temperature for terpene components of *cannabis*.

*Cannabis* oil is also known as *cannabis* concentrates, which are the cannabinoids that come from the female flowers of the *cannabis* plant. Cannabinoids are not water soluble so to extract them they have to be dissolved in a solvent. Carbon dioxide can be used as an effective solvent for solubilizing and extracting the oil and other components from *cannabis*. FIG. 11 shows optimal recovery temperature for selected terpene components of *cannabis*.

Selecting high *cannabis* oil plant material or a high yielding *cannabis* oil strain will maximize yields for oil extraction. When $CO_2$ is passed through the plant material containing cannabinoids, cannabinoids are dissolved in $CO_2$ and *cannabis* oil or concentrates will be obtained; the concentrates can be liberated by removing $CO_2$ which is then preferably recycled. An increase of temperature leads to reduction of density of supercritical fluid, whereas at the same time the increase of temperature affects the volatility of target compounds. For volatile oil extraction through supercritical $CO_2$, small changes in temperature can cause significant changes in solubility with a non-linear relationship. Whereas the operative pressure is the main parameter that influences the fluid density and therefore the solvent power of supercritical fluid, the effect temperature depends on the nature of plant material and has to be determined case by case.

Beyond the extraction parameters related to the engineering aspects such as pressure, temperature and flow rate, other factors related to the nature of plant material can influence the superfluid extraction. The particle size, shape, surface area, porosity, and moisture level of extractable solutes are variables that depend on the nature of the matrix or pretreatment of the plant material. As a rule, the smaller is the particle size of plant material, the higher it will be the exposed surface for supercritical $CO_2$ penetration and solute heat transfer. However, excessive grinding of plant material can also produce an extraction bed extremely thick and the supercritical $CO_2$ could find fast tracks inside the extractor causing a fluid channeling effect, thus reducing the solvent contact with the plant material and reducing the extraction efficiency.

The moisture content of the solid plant material influences not only the extraction quality and yield but also the fluid dynamics of the solvent during the extraction. Water can act as co-solvent by interacting with the supercritical solvent and by changing the overall polarity of the fluid. However, extracted water can increase the formation of ice blockages. It has been found that drying the raw material is recommended in order to have a water content of around 4-14% to reduce the incidence and size of ice formation during the superfluid extraction.

All publications, patents and patent applications mentioned in this specification are indicative of the level of skill of those skilled in the art to which this invention pertains and are herein incorporated by reference. The invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. A cyclone separator comprising:
  a cyclone inlet weldment comprising a cyclone and a needle inlet port;
  a collector tube weldment connected to the cyclone inlet weldment;
  a needle support manifold connected to the cyclone inlet weldment and further connected to a fluid flow line; and
  a fluid flow directing needle extending through the needle support manifold to the needle inlet port, the fluid flow directing needle having a relief cut creating a fluid flow channel between the needle and the needle inlet port to control fluid flow into the separator.

2. The separator of claim 1, wherein the needle is rotatable.

3. The separator of claim 1, wherein the relief cut in the needle is sized to create a desired pressure drop.

4. The separator of claim 1, wherein the relief cut is variable in cross sectional size.

5. The separator of claim 1, wherein the relief cut is variable in cross sectional shape.

6. The separator of claim 1, wherein the cyclone comprises a tapered cyclone insert.

7. The separator of claim 1, wherein the cyclone separator further comprises a temperature sensor, pressure gauge, pressure release valve, or combination thereof.

8. The separator of claim 1 further comprising a back pressure regulator to control back pressure in the cyclone.

9. A system for superfluid extraction of an extractant from a solid material comprising:
  a pump for pumping supercritical fluid at a pressure to maintain the supercritical fluid in a gas and liquid state;
  an extraction vessel; and
  a superfluid flow path comprising:
  a cyclone separator comprising a cyclone inlet weldment comprising a cyclone, a needle inlet port, and a collector tube connected to the cyclone inlet weldment;
  a needle support manifold connected to the cyclone inlet weldment and further connected to a fluid flow line; and
  a fluid flow directing needle extending through the needle support manifold to the needle inlet port, the fluid flow directing needle having a relief cut creating a fluid flow channel between the needle and the needle inlet port to control fluid flow into the cyclone separator.

10. The system of claim 9, wherein the needle is rotatable.

11. The system of claim 9, wherein the relief cut in the needle is sized to create a desired pressure drop.

12. The system of claim 9, comprising more than one superfluid flow path separated by a diverter.

13. The system of claim 9, wherein the superfluid flow path further comprises an additional separator.

14. The system of claim 9, wherein the relief cut is variable in cross sectional size.

15. The system of claim 9, wherein the relief cut is variable in cross sectional shape.

16. The system of claim 9, wherein the cyclone has a taper range of 10-170°.

17. The system of claim 9, further comprising one or more heaters to regulate temperature.

18. The system of claim 9 wherein the supercritical fluid is carbon dioxide.

19. The system of claim 9 further comprising a refrigeration circuit comprising a high pressure heat exchanger.

20. The system of claim 9 further comprising a back pressure regulator to control back pressure in the cyclone.

* * * * *